United States Patent
Zanoni et al.

(10) Patent No.: US 9,356,704 B1
(45) Date of Patent: *May 31, 2016

(54) OPTICAL CONVERSION SYSTEM AND METHOD WITH MULTIPLE PHASE PROCESSING

(71) Applicant: Rockwell Collins, Inc., Cedar Rapids, IA (US)

(72) Inventors: Raymond Zanoni, Columbia, MD (US);
Oliver S. King, Frederick, MD (US);
Wenlu Chen, Clarksville, MD (US);
Kim S. Jepsen, Ellicott City, MD (US);
Thomas J. Cullen, Ellicott City, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 126 days.

This patent is subject to a terminal disclaimer.

(21) Appl. No.: 13/963,899

(22) Filed: Aug. 9, 2013

(51) Int. Cl.
*H04B 10/06* (2006.01)
*H04B 10/60* (2013.01)
*H04B 10/61* (2013.01)
*H04B 10/63* (2013.01)
*G02F 7/00* (2006.01)

(52) U.S. Cl.
CPC ........ *H04B 10/60* (2013.01); *G02F 7/00* (2013.01); *H04B 10/61* (2013.01); *H04B 10/63* (2013.01)

(58) Field of Classification Search
USPC ......... 398/158, 159, 161, 202–209, 212–214, 398/115, 116; 341/137, 155
See application file for complete search history.

(56) References Cited

U.S. PATENT DOCUMENTS

| | | | |
|---|---|---|---|
| 4,384,291 A | 5/1983 | Lewis et al. | |
| 4,694,276 A | 9/1987 | Rastegar | |
| 4,732,447 A | 3/1988 | Wright et al. | |
| 4,928,007 A | 5/1990 | Furstenau et al. | |
| 4,968,986 A | 11/1990 | Wagner | |
| 5,010,346 A * | 4/1991 | Hamilton et al. | 341/137 |
| 5,109,441 A | 4/1992 | Glaab | |

(Continued)

FOREIGN PATENT DOCUMENTS

WO  WO-2011/010314 A2  1/2011

OTHER PUBLICATIONS

U.S. Appl. No. 13/536,929, filed Jun. 28, 2012, Zanoni et al.
(Continued)

*Primary Examiner* — Li Liu
(74) *Attorney, Agent, or Firm* — Donna P. Suchy; Daniel M. Barbieri

(57) ABSTRACT

A photonic processor can include a first input for a phase-modulated optical pulse signal, a second input for an optical reference signal, and a plurality of states. Each stage is configured to receive the phase-modulated optical pulse signal and a phase-delayed version of the optical reference signal. The phase-delayed version is phase-delayed in accordance with a phase position of the stage. Each stage is comprised of a reference path, a signal path, a coupler and a balanced photo detector. The coupler receives the phase-modulated optical pulse signal and provides as stage phase-modulated optical pulse signal to the signal path. The signal path is coupled to a first input of the balanced photo detector. The coupler also receives the phase-delayed version and provides a stage optical reference signal to the reference path. The reference path is coupled to a second input of the detector. The detector provides an electronic output signal corresponding to a phase relationship.

20 Claims, 2 Drawing Sheets

(56) References Cited

U.S. PATENT DOCUMENTS

| | | | |
|---|---|---|---|
| 5,955,875 A | 9/1999 | Twichell et al. | |
| 6,118,396 A * | 9/2000 | Song | 341/137 |
| 6,188,342 B1 | 2/2001 | Gallo | |
| 6,326,910 B1 | 12/2001 | Hayduk et al. | |
| 6,404,365 B1 | 6/2002 | Heflinger | |
| 6,404,366 B1 | 6/2002 | Clark et al. | |
| 6,420,985 B1 | 7/2002 | Toughlian et al. | |
| 6,459,522 B2 | 10/2002 | Yariv | |
| 6,469,649 B1 | 10/2002 | Helkey et al. | |
| 6,525,682 B2 | 2/2003 | Yap et al. | |
| 6,529,150 B1 | 3/2003 | Shoop et al. | |
| 6,567,436 B1 | 5/2003 | Yao et al. | |
| 6,661,361 B1 | 12/2003 | Lewis et al. | |
| 6,700,517 B1 | 3/2004 | Kellar | |
| 6,714,149 B2 | 3/2004 | Nunnally | |
| 6,771,201 B1 | 8/2004 | Currie | |
| 7,376,349 B2 | 5/2008 | Ionov et al. | |
| 7,389,055 B1 | 6/2008 | Rickard et al. | |
| 7,471,224 B2 | 12/2008 | Babbitt et al. | |
| 7,564,387 B1 * | 7/2009 | Vawter et al. | 341/137 |
| 7,570,184 B2 | 8/2009 | Ikeda et al. | |
| 7,671,771 B2 | 3/2010 | Hirono et al. | |
| 7,826,752 B1 * | 11/2010 | Zanoni et al. | 398/205 |
| 7,847,715 B2 | 12/2010 | Keith | |
| 7,867,246 B2 | 1/2011 | Kim | |
| 7,868,799 B1 * | 1/2011 | Price et al. | 341/137 |
| 7,876,246 B1 | 1/2011 | Price et al. | |
| 7,956,788 B2 * | 6/2011 | Lee et al. | 341/155 |
| 7,990,299 B2 | 8/2011 | Bell | |
| 8,263,928 B1 | 9/2012 | Efimov | |
| 8,315,387 B2 | 11/2012 | Kanter et al. | |
| 8,442,402 B1 | 5/2013 | Zanoni et al. | |
| 8,446,305 B1 | 5/2013 | Zanoni et al. | |
| 8,456,336 B1 | 6/2013 | Zanoni et al. | |
| 8,466,819 B2 | 6/2013 | Woodward et al. | |
| 8,548,331 B1 | 10/2013 | Zanoni et al. | |
| 8,779,955 B1 * | 7/2014 | Zanoni et al. | 341/137 |
| 8,837,956 B1 | 9/2014 | Zanoni et al. | |
| 2002/0067299 A1 | 6/2002 | Clark et al. | |
| 2002/0163454 A1 * | 11/2002 | Yap et al. | 341/137 |
| 2006/0093375 A1 | 5/2006 | Futami et al. | |
| 2007/0159369 A1 | 7/2007 | Currie et al. | |
| 2007/0223936 A1 | 9/2007 | Babbitt et al. | |
| 2009/0236501 A1 * | 9/2009 | Takahashi et al. | 250/214 R |
| 2010/0002281 A1 | 1/2010 | McDonald | |
| 2011/0002029 A1 | 1/2011 | McDonald | |
| 2011/0221627 A1 | 9/2011 | Pierno et al. | |
| 2011/0234435 A1 * | 9/2011 | Woodward et al. | 341/137 |
| 2012/0087653 A1 | 4/2012 | Sawada et al. | |
| 2012/0212360 A1 | 8/2012 | Kanter et al. | |
| 2012/0213531 A1 * | 8/2012 | Nazarathy et al. | 398/202 |
| 2012/0219302 A1 | 8/2012 | Sun et al. | |
| 2012/0224184 A1 | 9/2012 | Li et al. | |
| 2012/0299446 A1 | 11/2012 | Shmilovich et al. | |
| 2013/0016004 A1 | 1/2013 | Pierno et al. | |
| 2013/0077962 A1 | 3/2013 | Wu et al. | |
| 2013/0113641 A1 * | 5/2013 | Sudo et al. | 341/137 |
| 2013/0136450 A1 | 5/2013 | Roberts et al. | |
| 2013/0328706 A1 * | 12/2013 | Marom | 341/137 |
| 2014/0005966 A1 | 1/2014 | Fireaizen et al. | |

OTHER PUBLICATIONS

U.S. Appl. No. 13/626,642, filed Sep. 25, 2012, Zanoni et al.

Clark et al., Coherent Optical Phase-Modulation Link, IEEE Photonics Technology Letters, Aug. 15, 2007, 3 pages.

Clark et al., Photonics for RF Front Ends, IEEE Microwave Magazine, May 2011, 9 pages.

Valley et al., Photonic Analog-To-Digital Converters: Fundamental and Practical Limits, Integrated Optical Devices, Nanostructures, and Displays, Proceedings of SPIE, 2004, 11 pages.

Valley, Photonic Analog-to-Digital Converters, The Aerospace Corporation, 2009, 48 pages.

Valley, Photonic Analog-To-Digital Converters, The Aerospace Corporation, Mar. 5, 2007, 28 pages.

Zibar et al., Digital Coherent Receiver Employing Photonic Downconversion for Phase Modulated Radio-over-Fibre Links, downloaded on Aug. 2, 2010 from IEEE Xplore, 4 pages.

Zibar et al., Digital Coherent Receiver for Phase-Modulated Radio-Over-Fiber Optical Links, IEEE Photonics Technology Letters, Feb. 1, 2009, 3 pages.

Notice of Allowance for U.S. Appl. No. 13/204,158, mail date Jan. 29, 2013, 10 pages.

Notice of Allowance for U.S. Appl. No. 13/240,226, mail date Feb. 14, 2013, 4 pages.

U.S. Appl. No. 13/787,202, filed Mar. 6, 2013, Zanoni et al.

Notice of Allowance for U.S. Appl. No. 13/243,208, mail date Jun. 6, 2013, 11 pages Office Action on U.S. Appl. No. 13/536,929 Dated Mar. 6, 2014, 10 pages.

Office Action on U.S. Appl. No. 13/787,202 Dated Nov. 25, 2014, 19 pages.

Non-Final Office Action on U.S. Appl. No. 14/023,338 Dated Mar. 2, 2015, 9 pages.

Final Office Action on U.S. Appl. No. 13/787,202 Dated May 19, 2015, 22 pages.

Kikuchi, Coherent Optical Communications: Historical Perspectives and Future Directions, 2010, High Spectral Density Optical Communication Technologies, Optical and Fiber Communication Reports, Springer-Verlag Berlin Heidelber, pp. 11-49.

* cited by examiner

OPTICAL CONVERSION SYSTEM AND METHOD WITH MULTIPLE PHASE PROCESSING

CROSS-REFERENCE TO RELATED APPLICATIONS

This application is related to U.S. patent application Ser. No. 13/963,876, filed on an even date herewith, by Zanoni et al., entitled "OPTICAL CONVERSION SYSTEM AND METHOD WITH MULTIPLE AMPLITUDE PROCESSING," U.S. patent application Ser. No. 13/787,202 titled "OPTICAL SAMPLE AND HOLD SYSTEM AND METHOD" filed Mar. 6, 2013, by Zanoni et al., U.S. patent application Ser. No. 13/240,226, now issued U.S. Pat. No. 8,456,336, entitled "OPTICAL DESERIALIZATION WITH GATED DETECTORS, SYSTEM AND METHOD", filed on Sep. 22, 2011, by Zanoni et al., U.S. patent application Ser. No. 13/204,158, now issued U.S. Pat. No. 8,442,402 entitled "WIDE BAND DIGITAL RECEIVER: SYSTEM AND METHOD", filed on Aug. 5, 2011, by Zanoni et al., U.S. patent application Ser. No. 13/626,642, now issued U.S. Pat. No. 8,779,955 entitled "OPTICAL ANALOG-TO-DIGITAL CONVERSION SYSTEM AND METHOD WITH ENHANCED QUANTIZATION", filed on Sep. 25, 2012, by Zanoni et al., and U.S. patent application Ser. No. 13/536,929, now issued U.S. Pat. No. 8,837,956 entitled "PIPELINED RECEIVER SYSTEM AND METHOD", filed on Jun. 28, 2012, by Zanoni et al., all assigned to the Assignee of this patent application and incorporated in their entireties herein by reference.

FIELD OF THE INVENTION

The present specification relates to optical or photonic processors, including but not limited to a processor for a photonic analog-to-digital converter (pADC) in high frequency (e.g., 100+ megahertz (MHz) and multi-gigahertz (GHz) radio frequency (RF)) systems. More particularly, the present specification relates to a multi-phase photonic processor.

Photonic processing techniques are used in a wide variety of applications. Communication and sensing devices frequently use photonic processing based analog-to-digital conversion to convert an analog signal to a digital signal. High speed analog-to-digital conversion is utilized in radio frequency (RF) receivers used in military, commercial and consumer applications. Products that utilize analog-to-digital signal conversion include, but are not limited to: electronic intelligence (FLINT) receivers, cell phones, wireless local area components, radars (e.g., synthetic aperture radar (SAR)), sensors, high frequency (e.g., 100 megahertz (MHz) and multi-Giga Hertz (GHZ)) systems, etc.

Optical or photonic analog-to-digital converters (pADC) can reduce the size, weight, and power requirements of the systems in which they are employed. The pADC generally includes at least one I/Q demodulator, optical switches, and at least one electronic analog-to-digital converter (eADC). The I/Q demodulator and optical switches can add to the size, weight and power usage of the optical portion of the pADC. The eADC is generally a high resolution ADC which adds to the size, weight and power usage of the electronic portion of the pADC.

Accordingly, there is a need for an analog-to-digital conversion system and method configured for reduced size, cost, weight and/or power consumption. Further still, there is a need for an improved photonic analog-to-digital converter (pADC) system and method which provides multiphase demodulation. Yet further, there is a need for an ADC with a simplified optical processor that provides phase demodulation. Still further there is a need for a pADC that does not require a high resolution eADC or I/Q demodulator. There is further a need for an optical processing system and method that provides multiphase signal processing. There is also a need for a flash photonic multiphase converter that does not require I/Q demodulators. There is further a need for a high speed flash photonic processor for phase modulated signals with reduced circuit size.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY OF THE INVENTION

An exemplary embodiment relates to a photonic processor. The photonic processor includes a first input configured to receive a phase-modulated optical pulse signal, a second input configured to receive an optical reference signal and a plurality of stages. Each stage is configured to receive the phase-modulated optical pulse signal and a phase-delayed version of the optical reference signal. The phase-delayed version of the optical reference signal is phase-delayed in accordance with a phase position of the stage. Each stage is comprised of a reference path, a signal path, a coupler and a balanced photo detector. The coupler receives the phase-modulated optical pulse signal and provides a stage phase-modulated optical pulse signal to the signal path. The signal path is coupled to a first input of the balanced photo detector. The coupler receives the phase-delayed version of the optical reference signal and provides a stage optical reference signal to the reference path. The reference path is coupled to a second input of the balanced photo detector. The balanced photo detector provides an electronic output signal corresponding to a phase relationship of the stage optical reference signal and the stage phase-modulated optical pulse signal.

Another embodiment relates to a photonic processor including a first input configured to receive a phase-modulated optical pulse signal, a second input configured to receive an optical reference signal, and a number of stages. Each stage is configured to receive the phase-modulated optical pulse signal and a phase-delayed version of the optical reference signal. The phase-delayed version of the optical reference signal is phase-delayed in accordance with a phase position of the stage. Each stage is comprised of a reference path, a signal path, and a directional coupler coupled to the reference path and the signal path and used to interferometrically combine the phase-modulated optical pulse signal and the phase-delayed version of the optical reference signal for the stage. Each stage also includes a balanced photo detector that provides an electronic output signal corresponding to a phase relationship of the phase-delayed version of the optical reference signal and the phase-modulated optical pulse signal for the stage.

Another exemplary embodiment relates to a method of multi-phase processing. The method includes receiving a phase-modulated optical pulse signal at a plurality of stages. The method also includes receiving a respective phase-delayed version of an optical reference signal at the plurality of stages. The respective phase-delayed version of the optical reference signal is phase-delayed in accordance with a phase position of the stage. The method also includes comparing the respective phase-delayed version of the optical reference signal with the phase-modulated optical pulse signal at each stage, and providing an electronic output signal corresponding to a phase relationship of the phase-delayed optical reference signal and the phase-modulated optical pulse signal at each stage.

Another exemplary embodiment relates to a multiphase photonic processor. The multiphase photonic processor includes a phase-modulator configured to receive an electronic radio frequency signal and an optical clock signal and to provide a phase-modulated optical signal on a first signal path. The optical clock is provided on a second signal path. The multiphase photonic processor also includes a first signal optical coupler for providing a first level of power of the phase-modulated optical signal to a first input of a first photo detector, a first reference optical coupler for providing a first level of power of the optical clock signal to a second input of the first photo detector. The first photo detector is a balanced photo detector. The multiphase photonic processor also includes a second signal optical coupler for providing a second level of power of the phase-modulated optical signal to a third input of a second photo detector, the second level of power being approximately equal to the first level of power. The multiphase photonic processor also includes a second reference optical coupler for providing a second level of power of the optical clock signal to an input of a first delay element. An output of the delay element is coupled to a fourth input of the second photo detector. The second photo detector is a balanced photo detector. The photonic processor further includes a first output associated with the first photo detector, and a second output associated with the second photo detector. The first output and the second output provide a thermometer electronic output signal corresponding to a phase relationship of the optical clock signal and the phase-modulated optical pulse signal.

BRIEF DESCRIPTION OF THE DRAWINGS

Embodiments of the invention will become more fully understood from the following detailed description, taken in conjunction with the accompanying drawings, wherein like reference numerals denote the same or similar elements and in which.

DETAILED DESCRIPTION OF THE PREFERRED EMBODIMENTS

Figure 1:
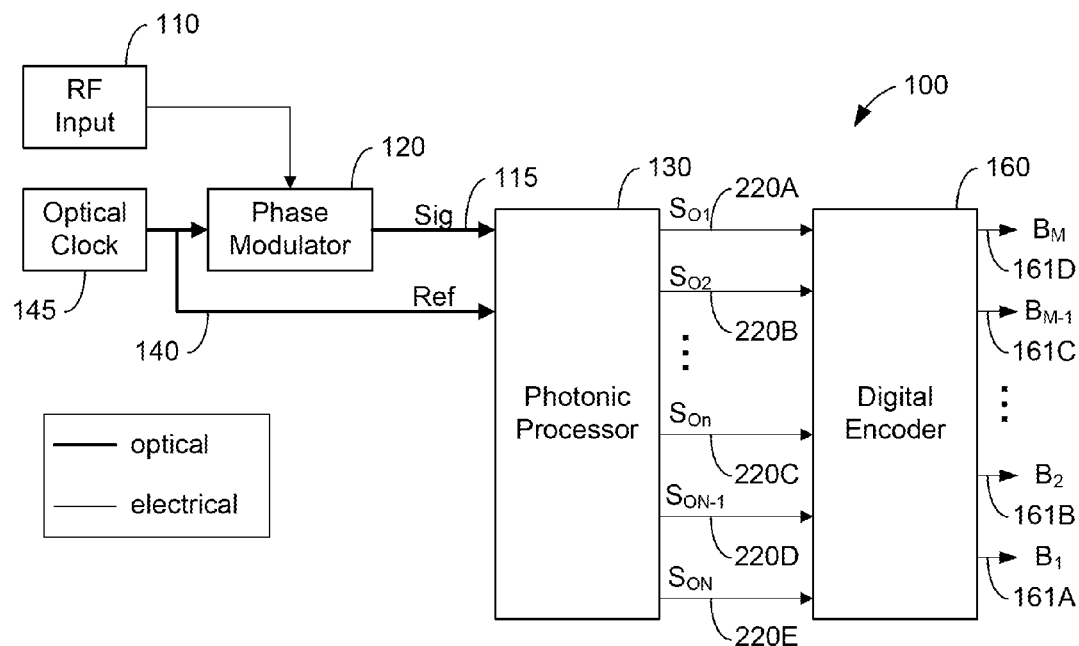
FIG. 1 is a general schematic block diagram of a photonic analog-to-digital converter (pADC) including an photonic processor according to an exemplary embodiment.

Before describing in detail the particular improved system and method, it should be observed that the invention includes, but is not limited to, a novel structural combination of components and not in the particular detailed configurations thereof. Accordingly, the structure, software, methods, functions, control and arrangement of components have been illustrated in the drawings by readily understandable block representations and schematic drawings, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

At least one embodiment relates to a photonic processor for use in a photonic analog-to-digital converter (pADC), for example, a pADC provided in a wide band or narrowband RF receiver. However, the pADC systems and methods of the specification can be utilized in any type of conversion applications. The pADC can be used for different types of receiving applications, including but not limited to applications associated with cellular phones, wireless devices, radios (e.g., software defined radio, radio receivers capable of wide band or narrowband receiver operations, etc.), radars (e.g., a digital radar synthetic aperture radar (SAR)), sensors, etc. Advantageously, certain embodiments of systems and methods described herein reduce the need for expensive eADCs and provide multi-phase quantization without I/Q demodulators. Multi-phase quantization can provide adaptability to changing system requirements and design criteria.

Performing the sampling process using phase modulated optical pulses, as contrasted to simply relaying the RF signal to an electronic ADC for sampling, provides advantages in certain embodiments. Optical sampling allows the sampling to occur using an ultra-low jitter optical pulse source in one embodiment. Various embodiments can achieve one or more of the benefits described above.

FIG. 1 shows a photonic analog-to-digital converter (pADC) 100 according to one embodiment. In one embodiment, pADC 100 is embodied as an M-bit pADC based upon N outputs 220A-E from a photonic processor 130. N is an integer from 2 to a number where circuit design efficiency is practicable. In one embodiment, N can be 2, 3, 4, 5, 6, 7, 8, 9, . . . 16, 17, 18, 19, . . . 32, . . . 64. pADC 100 utilizes multiphase demodulation and provides a thermometer type signal at outputs 220A-E (e.g., $S_{O1}$-$S_{ON}$) which can be converted to a data signal (e.g., $B_1$-$B_M$) by a digital logic circuit 160 at outputs 161A-D in one embodiment.

Although specific techniques, parameters, bit values and coordinates for the various conversion systems and methods described herein, they are not disclosed in a limiting fashion. Various adjustments to the types of signals, frequency of operation, types of modulation, etc. can be made without departing from the scope of the invention.

In one embodiment, pADC 100 includes an optical clock 145 for supplying a high repetition rate stream of optical pulses with very low clock jitter (e.g., an optical clock signal or optical reference signal). Examples of this type of device include a mode locked laser (MLL) and a coupled optoelectronic oscillator (COEO). Any type of suitable optical clock can be utilized.

In one embodiment, pADC 100 receives an RF voltage or signal V(t) at an RF input 110. RF input 110 can be any terminal or circuit for receiving an input signal. In one embodiment, RF input 110 is coupled to a wide band antenna (not shown in FIG. 1). The input signal at RF input 110 is provided to a phase modulator 120, which performs phase modulation in response to the optical pulse signal (e.g., optical clock signal) and the input signal. Phase modulator 120 outputs a phase-modulated optical pulse stream or signal of an output 115.

The phase-modulated optical pulse stream or signal is provided in accordance with the Nyquist sampling principles. In one embodiment, the optical clock repetition rate is provided at two times the RF input signal frequency. The RF signal can be a phase-modulated signal representing data using a phase delay or phase angle θ in one embodiment.

In one embodiment, pADC 100 also includes optical or photonic processor 130 connected to receive signals (e.g., the phase-modulated signal) on a signal path or output 115. Photonic processor 130 is also coupled to a signal path or an output 140 associated with the optical clock signal (e.g., a reference signal) from clock 145. The reference signal is coherent with the phase-modulated signal in one embodiment.

Processor 130 provides electronic signals associated with the phase of the RF signal V(t) in electronic format to an electronic logic circuit 160. Processor 130 can be configured as an optical phase demodulator in one embodiment. In one embodiment, processor 130 provides signals $S_{O1}$, $S_{O2}$, $S_{O3}$, $S_{O4}$, ..., $S_{ON}$. The electronic signals are provided to digital logic circuit 160.

In one embodiment, logic circuit 160 provides a data signal. Processor 130 and logic circuit 160 can operate as low resolution flash eADC. Using photonic processor 130 requires less power (e.g., micro watts of peak optical power) than a conventional eADC.

Digital logic circuit 160 can be embodied as an encoder, one or more logical gates, a processor, ASIC, etc. Digital logic circuit 160 provides a data signal including at least one bit. In one embodiment, circuit 160 provides bits $B_1$, $B_2$, $B_3$, $B_M$ as a data signal. The bit signals are provided as an electronic data signal.

Digital logic circuit 160 is a clocked digital encoder in one embodiment and can receive an electronic clock signal converted from the optical pulse signal at output 140 in one embodiment. A photo detector 270 (FIG. 2) in processor 130 can be configured to provide an electronic clock output 274 for processor 130 and logic circuit 160 from a phase-delayed version of the optical clock signal at output 140.

According to various embodiments, pADC 100 can be utilized in a variety of applications including high capacity optical communications receivers, telecommunication receivers, Department of Defense (DOD) wide receiver technology, digital radar, sensors, etc. In another embodiment, processor 130 can provide multi-phase processing in coherent optical communications for telecommunications. The processor 130 can be used in telecom networks that employ RZ transmission where the RZ pulses are modulated using multi-level phase modulation. The multi-level phase processing by processor 130 enables decoding of the signal in one embodiment. In one embodiment, pADC 100 can be implemented using optical and electric circuit components as described herein including processors, FPGAs, ASICS, optoelectronic circuits, etc.

Phase modulator 120 can be a phase modulator such as described in U.S. patent application Ser. No. 13/240,226. Clock 145 can be an optical clock as 800 described in U.S. patent application Ser. No. 13/240,226. As shown in FIG. 1, the signal path at output 115 and the reference path at output 140 are separate paths that do not directly intersect or directly connect with each other, but whereby both paths provide input signals to processor 130 according to one embodiment.

Processor 130 according to an embodiment as shown in FIG. 1 can operate at 8 GHz and have a bandwidth in the C-band of 1530-1550 nanometers. In one embodiment, processor 130 can be comprised of separate stages; each stage can provide one of signals $S_{O1}$-$S_{ON}$ at outputs 220A-E corresponding to a phase delay associated with the phase-modulated signal. Reference phase delays for the stages can be hard coded into processor 130. The optical pulse width can be 2 picoseconds, and the phase resolution between successive stages can be 180/(N−2) degrees.

Each stage in processor 130 can include a balanced photo detector for providing the signal at outputs 220A-E. The stages can be arranged in a ladder structure for flash ADC operation in one embodiment. In one embodiment, flash ADC structures can be building blocks for more sophisticated ADC technology such as successive approximation register (SAR) ADCs. The current output responsivity at each of outputs 220A-E ($S_{O1}$-$S_{ON}$) without waveguide losses is approximately 0.8 A/W in one embodiment.

Figure 2:
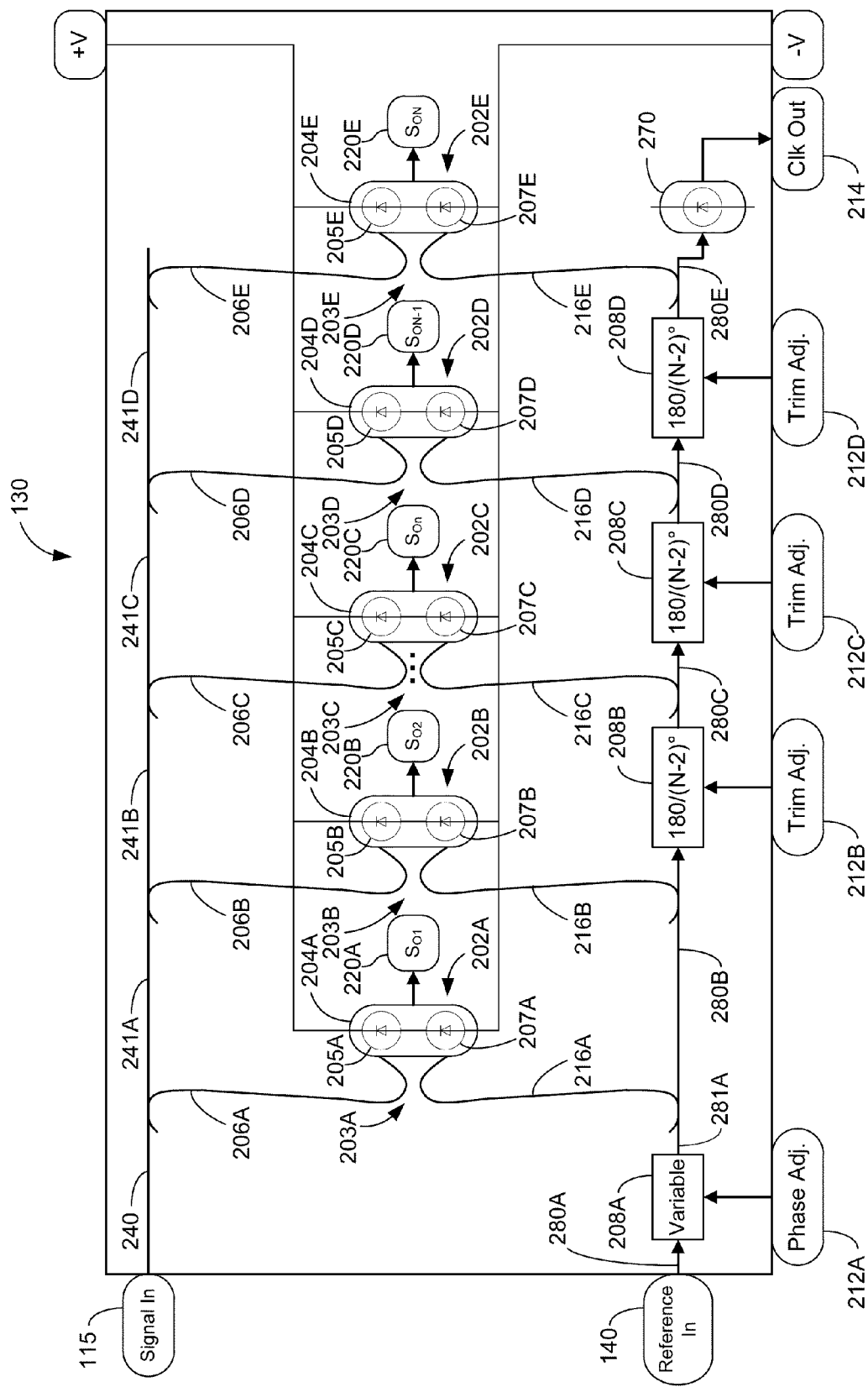
FIG. 2 is a more detailed schematic block diagram of the photonic processor for the photonic analog-to-digital converter (pADC) illustrated in FIG. 1, according to another exemplary embodiment.

With reference to FIG. 2, an embodiment of photonic processor 130 includes a number of stages 202A-E. As discussed above, the number of stages 202A-E can be any number of stages. In one embodiment, stage 220A corresponds to stage 1, stage 220B corresponds to stage 2, stage 220C corresponds to stage n, stage 220D corresponds to stage N−1 and stage 220E corresponds to stage N. In one embodiment, n is equal to 3 and N is equal to 5, although N can be any integer more than 3 in certain embodiments. Each of stages 220A-E includes a respective output 220A-E which provides an electronic signal for reception by digital logic circuit 160 (FIG. 1) in one embodiment.

Stage 202A includes an optical coupler comprised of a coupler 206A and a coupler 216A. Stage 202A also includes a photo detector 204A and a coupler 203A. Couplers 206A and 216A can each have a 1550 nm optical input and extract a portion of the power from the signal or reference paths (e.g. paths 240 and 281A) in one embodiment. Couplers 203A-E are respectively provided in each stage 202A-E. Coupler 203A brings paths from couplers 206A and 216A together before entering photo detector 204A. In one embodiment, couplers 203A-E are 3 db directional couplers and are used to interferometrically combine the phase-modulated optical pulse signal and the phase-delayed version of the optical reference signal for respective stages 202A-E. Photo detector 204A is comprised of a photo diode 205A and a photo diode 207A. Photo detector 204A is coupled to output 220A. Each of stages 202B, C, D and E include similar elements denoted with a respective reference numeral suffix. Stages 202A-E can have an optical ladder structure using large scale nanophotonic phased array technology in one embodiment. Diodes 205A-E and 207A-E can be germanium or InGaAs photo diodes.

Coupler 206A is coupled to an optical signal path 240 coupled to output 115 which provides the phase-modulated signal from phase modulator 120. Coupler 206A provides an amplitude or power associated with the phase modulated signal on path 240 to a signal path coupled to a coupler 203A. Coupler 216A receives a phase-delayed version of the reference signal from output 140 on a path 280A from an optical delay element 208A and provides an amplitude or power level of the phase-delayed reference signal at a reference path 280B to coupler 203A. Coupler 203A provides signals to a first input of detector 205A and a second input of detector 205A. The first input of detector 204A can be associated with photo diode 205A, and the second input of photo detector 204A can be associated with photo diode 207A. Photo diodes 207A and 205A are balanced and form a balanced photo detector 204A in one embodiment.

Phase delay circuit or optical delay element 208A provides a delay for the reference signal at output 140. Phase delay element 208A can be part of stage 202A, part of a reference path 280A, part of a reference path 280B. Photo detector 204A and coupler 203A compare the phase-modulated signal at the first input of detector 204A to a version of the phase-delayed signal from coupler 216A to provide an electronic signal representing the phase delay associated with the phase-modulated optical signal at output 220A. Stages 202C-E provides similar electric signals representing the phase delay associated with the phase-modulated optical signal using photo detectors 202C-E. Delay elements 280B-D provide successive delays for phased-delayed versions of the reference signals on respective paths 280C-E. The total delays for the phase-delayed versions correspond to the position of each stage 202B-E. Phase delay elements 208B-D can be part of stages 202C-E, or part of a reference paths 280B-D in certain embodiments.

Stage 202B provides an electric signal associated with the phase-modulated optical signal on path 206B and the reference signal on path 216B. The first stage 202A is used for stabilization of the phase at the input of photonic processor 130 in one embodiment. In one embodiment, a reference tone that lies outside of the ADC conversion band is used in conjunction with an electronic control loop and variable phase element 208A to eliminate spurious phase variations introduced on the signal between the phase modulator 120 and the input to photonic processor 130 due to, for instance, acoustic vibration or thermal drift. Stage 202B is the first stage that is used in the conversion process. The last stage 202E is likewise used in conjunction with an electronic control loop and phase trim adjust inputs 212B-212D to correct for any spurious phase changes introduced on the signal paths within photonic processor 130.

The power level provided by each of couplers 206A-E for respective stages 202A-E is approximately equal in one embodiment. In one embodiment, the power level for the phase-modulated signal received by detector 204A is 100/N percent of the signal on path 240, the power level for the phase-modulated signal received by detector 204B is 100/(N−1) percent of the signal on path 241A, the power level for the phase-modulated signal received by detector 204C is 100/(N−(n−1)) percent of the signal on path 241B, the power level for the phase-modulated signal received by detector 204D is 100/(N−(N−2)) percent of the signal on path 241C, the power level for the phase-modulated signal received by detector 204E is 100/(N−(N−1)) percent of the signal on path 241D. Accordingly, in one embodiment, couplers 206A-E are configured so the power level received by each of stages 202A-E is approximately equal. In one embodiment, each subsequent stage of stages 202C-E takes more of the power from the signal on its respective path 241A-D than the preceding stage 202B-D.

A similar configuration of couplers 216A-E providing appropriate power levels can be utilized for the phase-delayed reference signals on the reference paths 280A-E. In one embodiment, the signals at outputs 115 and 140 have equal power. The optical signals from inputs 115 and 140 are equally balanced along the ladder structure associated with processor 130 in one embodiment.

In one embodiment, each of stages 202B-E has a respective intra-stage phase-delay element 208B-D. Each of phase-delay elements 208B-D can provide a phase delay element equal to 180/(N−2) degrees. If a 5 stage photonic processor 130 is implemented according to one embodiment, 20% of the power of the phase-modulated signal is received by each of stages 202A-E, and phase-delay elements 208B, 208C and 208D provide a 60 degree phase delay for each of stages 202C-E.

Each of phase-delay elements 208A, 208B, 208C, 208D include a respective trim or phase adjust input 212A, 212B, 212C and 212D. Phase delay elements can be embodied as differential (with respect to the signal path) optical path length differences implemented as a physical path length change or refractive index difference and can provide a total phase delay of 180 degrees over the ladder configuration of stages 202A-E. Examples of a phase delay elements include lengths of glass or semiconductor optical waveguide, segments of optical waveguides doped with an impurity in order to raise the refractive index over the nominal index, segments of optical waveguides irradiated with ultraviolet light in order to raise the refractive index, or some combination of the above. Further, a phase delay may be dynamically trimmed or adjusted through the use of the thermo-optic effect whereby the temperature of a length of optical waveguide is changed in order to change the refractive index of said segment. In one embodiment, this is accomplished through the use of micro-heater elements embedded in the vicinity of the optical waveguide segment.

In certain embodiments, the phase delay between each of stages 202B-D is 45 degrees, 22.5 degrees, or other delay appropriate for the number of stages 202A-E. The output provided by processor 130 can be a flash/thermometer output, where the phase is along a length of a reference line that can be compared to a single phase and each of stages 202B-E provides an indication of the phase compared to an appropriate reference. If the phase is larger than the respective reference signal, each of detectors 204B-E provides a signal at respective outputs 220B-E which is different than when the phase is less than the reference phase in one embodiment. Accordingly, processor 130 operates according to a phase ladder in one embodiment.

Phase adjustment inputs 212B-D allow changes to individual phase delays elements 208B-D to be made. Periodic calibration can be performed to determine the trim values at inputs 212-B-D. For example, monitoring of stages 202B-E can be utilized to make adjustments to delay elements 208 B-D. The respective phase-delayed versions of the reference signal can be monitored to ensure that the 180 degree phase change is achieved across the structure in one embodiment. Calibration is achieved by comparing the digital output of the pADC to a known calibrated test input signal. An analysis of the deviation of the measured signal for the test signal can be used to generate a unique set of trim adjust signals 212B-D. On application of these signals to phase elements 208B-D, the test signal can again be measured to assure the desired correction has been effected.

The total phase delay across stages 202A-E can be compared to a 180 degree threshold to ensure that the total of 180 degree phase is obtained in one embodiment. Also, each individual phase differences between stages can be compared to ensure phase calibration in one embodiment. Phase elements 208A-D can be configured by laser trimming or exposure to UV light to change the phase for particular segments. Trimming can occur during integrated circuit fabrication.

In one embodiment, stage 202A is utilized for calibration and utilizes a variable phase shifter 208A embodied as a thermo-optic effect phase element with resistive heater. In one embodiment, element 208A trims the phase of the reference signal on output 180 such that the relative phase shift monitored by stage 202A is held constant.

Processor 130 can be provided as a planer lightweight circuit (PLC) have multiple stages 202A-E. Waveguides for the PLC can be mode-matched to a panda fiber.

The signal at the output of phase-delay element 208D is provided to photo detector 270 to provide an electronic clock signal at output 214

Figure 3:
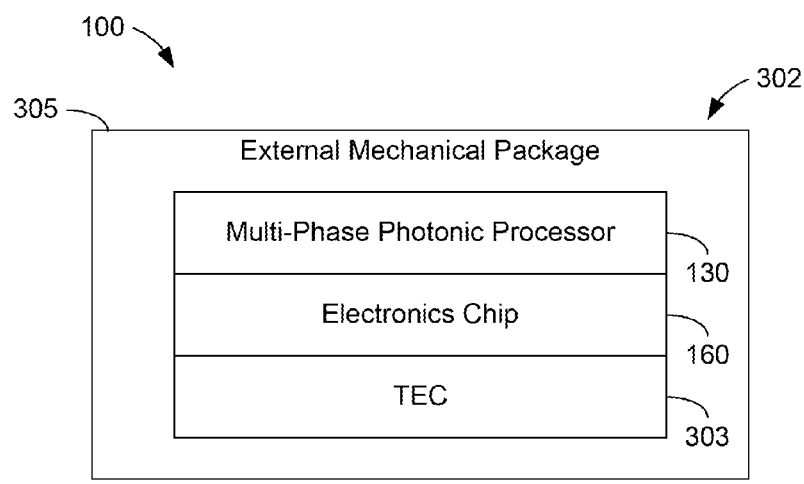
FIG. 3 is a side view schematic representation of a package for the photonic analog-to-digital converter illustrated in FIG. 1, according to yet another exemplary embodiment.

With reference to FIG. 3, a package 302 for pADC 100 can include an external mechanical package 305 which surrounds multi-phase photonic processor 130, an electronics chip 160, and a thermal electric cooler 303. The electronics chip 160 is preferably next to the thermal electric cooler 303. In one embodiment, heterogeneously integrated silicon platform for package 300 and pADC 100 can lower power dissipation, lower parasitics, lower manufacturing costs, and allow phase shifts, path lengths, etc. to be hard coded in lithography.

It is understood that while the detailed drawings, specific examples, material types, thicknesses, dimensions, and particular values given provide a preferred exemplary embodiment of the present invention, the preferred exemplary embodiment is for the purpose of illustration only. The method and apparatus of the invention is not limited to the precise details and conditions disclosed. For example, although specific types of optical component, dimensions and angles are mentioned, other components, dimensions and angles can be utilized. Also, while an optical conversion with balanced detectors system and method have been described above with respect to inclusion in a wide band or a narrowband receiver, it can be implemented in other types of high-frequency band receivers, such as receivers operating up to hundreds of GHz. Various changes may be made to the details disclosed without departing from the spirit of the invention which is defined by the following claims.

What is claimed is:

1. A photonic processor, comprising:
   a first input configured to receive a phase-modulated optical pulse signal;
   a second input configured to receive an optical reference signal;
   a plurality of stages, each stage being configured to receive the phase-modulated optical pulse signal and a phase-delayed version of the optical reference signal, the phase-delayed version of the optical reference signal being phase-delayed in accordance with a phase position of the stage, wherein each stage is comprised of:
   a reference coupler;
   a phase delay;
   a signal coupler;
   a reference source path;
   a signal source path;
   a reference path;
   a signal path, wherein the signal coupler is coupled to the signal path, to the signal source path and to a signal source path of the next stage, and wherein the reference coupler is coupled to the reference path, to the phase delay and to a reference source path of the next stage, wherein the phase delay is coupled to the reference coupler of the preceding stage;
   a directional coupler coupled to the reference coupler and the signal coupler and used to interferometrically combine the phase-modulated optical pulse signal and the phase-delayed version of the optical reference signal for the stage; and
   a balanced photo detector coupled to the directional coupler, wherein the balanced photo detector provides an electronic output signal corresponding to a phase relationship of the phase-delayed version of the optical reference signal and the phase-modulated optical pulse signal for the stage;
   a first stage having a variable phase delay, the first stage being provided before the plurality of stages; and
   a second stage being after the first stage and before the plurality of stages, wherein a reference signal received by an optical coupler in the second stage has a same phase as a reference signal received by an optical coupler in the first stage.

2. The photonic processor according to claim 1, wherein the phase delay in each stage provides an equal phase delay.

3. The photonic processor according to claim 2, wherein the balanced photo detector is at least one pair of photo diodes.

4. A photonic processor, comprising:
   a first input configured to receive a phase-modulated optical pulse signal;
   a second input configured to receive an optical reference signal; and
   a first set of a plurality of stages, each stage of the first set being configured to receive the phase-modulated optical pulse signal and a phase-delayed version of the optical reference signal, the phase-delayed version of the optical reference signal being phase-delayed in accordance with a phase position of each stage among the first set of stages, wherein each stage of the first set is comprised of:
   a reference path;
   a signal path;
   a directional coupler coupled to the reference path and the signal path and used to interferometrically combine the phase-modulated optical pulse signal and the phase-delayed version of the optical reference signal;
   a balanced photo detector coupled to the directional coupler, wherein the balanced photo detector provides an electronic output signal corresponding to a phase relationship of the phase-delayed version of the optical reference signal and the phase-modulated optical pulse; and
   a second set of a plurality of stages, each stage of the second set being configured to receive the phase-modulated optical pulse signal and a version of the optical reference signal, wherein each stage of the second set is comprised of:
   a reference path;
   a signal path;
   a directional coupler coupled to the reference path and the signal path and used to interferometrically combine the phase-modulated optical pulse signal and the version of the optical reference signal; and
   a balanced photo detector coupled to the directional coupler, wherein the balanced photo detector provides an electronic output signal corresponding to a phase relationship of the version of the optical reference signal and the phase-modulated optical pulse signal;
   wherein the second set of stages comprises a first stage having a variable phase delay serving to eliminate spurious phase variations in the signal paths and the reference paths, and a second stage, wherein the version of the optical reference signal received by the second stage has a same phase as the version of the optical reference signal received by the first stage.

5. The photonic processor according to claim 4, wherein the second stage of the second set of stages is disposed after the first stage of the second set of stages and before the first set of stages.

6. A method of multi-phase processing, the method comprising:
   receiving a phase-modulated optical pulse signal from a first optical coupler at a plurality of stages;
   receiving a respective phase-delayed version of an optical reference signal from a second optical coupler at the plurality of stages, the respective phase-delayed version of the optical reference signal being phase-delayed in accordance with a phase position of the stage by an optical phase-delay element, wherein an input to the second optical coupler of at least one of the plurality of stages is coupled to an output of the phase-delay element of the preceding stage;

receiving a first reference signal at a first stage having a variable phase delay, the first stage being provided before the plurality of stages;

receiving a second reference signal at a second stage being after the first stage and before the plurality of stages, wherein the second reference signal is received by an optical coupler in the second stage and has a same phase as the first reference signal received by an optical coupler in the first stage;

combining and comparing the respective phase-delayed version of the optical reference signal with the phase-modulated optical pulse signal for the plurality of stages at each stage using a directional coupler and a pair of photo diodes in each stage; and providing an electronic output signal corresponding to a phase relationship of the phase-delayed optical reference signal and the phase-modulated optical pulse signal at each stage of the plurality of stages.

7. The method according to claim 6, wherein the optical coupler at each stage provides the respective phase-delayed version for the stage to the directional coupler and provides an output phase delayed signal to a next stage, the output phase delayed signal having a lower power level than an output phase delayed signal from a preceding stage, wherein the power level of the respective phase-delayed version for each stage is equal.

8. The method according to claim 7, wherein the electronic output signal is provided as a thermometer output indicating a phase position of the phase-modulated optical pulse signal.

9. The method according to claim 6, wherein each optical phase delay element is equal in phase delay.

10. A multiphase photonic processor, comprising:
a phase modulator configured to receive an electronic radio frequency signal and an optical clock signal and to provide a phase-modulated optical signal on a first signal path, wherein the optical clock signal is provided on a second signal path;
a first directional coupler;
a first signal optical coupler for providing a first level of power of the phase-modulated optical signal to a first input of the first directional coupler;
a first reference optical coupler for providing a version of the optical clock signal to a second input of the first directional coupler;
a first balanced photodetector having a first input coupled to a first output of the first directional coupler and a second input coupled to a second output of the first directional coupler;
a second directional coupler;
a second signal optical coupler for providing a second level of power of the phase-modulated optical signal to a first input of the second directional coupler, the second level of power of the phase-modulated optical signal being approximately equal to the first level of power of the phase-modulated optical signal;
a second reference optical coupler for providing a delayed version of the optical clock signal to a second input of the second directional coupler;
a second balanced photodetector having a first input coupled to a first output of the second directional coupler and a second input coupled to a second output of the second directional coupler;
a third directional coupler;
a third signal optical coupler for providing a third level of power of the phase-modulated optical signal to a first input of the third directional coupler, the third level of power of the phase-modulated optical signal being greater than the first and second levels of power of the phase-modulated optical signal;
a third reference optical coupler for providing a delayed version of the optical clock signal to a second input of the third directional coupler;
a third balanced photodetector having a first input coupled to a first output of the third directional coupler and a second input coupled to a second output of the third directional coupler;
a first output associated with the first balanced photo detector;
a second output associated with the second balanced photo detector; and
a third output associated with the third balanced photodetector, wherein the first, second, and third outputs associated with the respective first, second, and third balanced photodetectors provide a thermometer electronic output signal corresponding to a phase relationship of the optical clock signal and the phase-modulated optical pulse signal.

11. The multiphase photonic processor according to claim 10, further comprising:
a delay element between the first reference optical coupler and the second reference optical coupler; and
a first trim adjust input for adjusting a delay provided by the delay element.

12. The multiphase photonic processor according to claim 10, further comprising:
a first delay element disposed between the first reference optical coupler and the second reference optical coupler.

13. The multiphase photonic processor according to claim 12, further comprising a trim adjust for the first delay element.

14. The multiphase photonic processor according to claim 13, wherein a second trim adjust is used to calibrate delay in the photonic processor.

15. The multiphase photonic processor according to claim 14, wherein the first delay element is coupled directly to the first reference optical coupler and the second reference optical coupler.

16. The multiphase photonic processor according to claim 14, wherein a variable delay is disposed before the first reference optical coupler and is used to calibrate for eliminating spurious phase variations.

17. The multiphase photonic processor according to claim 13 wherein the nth delay element is a thermo optic variable phase element with an embedded heater.

18. The multiphase photonic processor according to claim 12 wherein the first delay element is a thermo optic variable phase element with an embedded heater.

19. The photonic processor according to claim 10, further comprising wherein a reference signal received by the first reference optical coupler has a same phase as a reference signal received by a fourth reference signal optical coupler before the first reference signal optical coupler.

20. The multiphase photonic processor according to claim 10, wherein the delayed version of the optical clock signal for each reference optical coupler has a phase delay that is equal.

* * * * *